(12) United States Patent
Xue et al.

(10) Patent No.: US 10,819,233 B2
(45) Date of Patent: Oct. 27, 2020

(54) SWITCHED COMMON-MODE CURRENT CONTROL FOR SINGLE-INDUCTOR-MULTIPLE-OUTPUT (SIMO) POWER CONVERTERS

(71) Applicant: QUALCOMM Incorporated, San Diego, CA (US)

(72) Inventors: Lin Xue, San Diego, CA (US); Iulian Mirea, San Diego, CA (US); Xiaocheng Jing, Milpitas, CA (US); Jongshick Ahn, San Diego, CA (US); Amir Parayandeh, San Francisco, CA (US); Linfei Guo, Daly City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/246,107

(22) Filed: Jan. 11, 2019

(65) Prior Publication Data

US 2020/0076299 A1    Mar. 5, 2020

Related U.S. Application Data

(60) Provisional application No. 62/725,037, filed on Aug. 30, 2018.

(51) Int. Cl.
*H02M 3/158* (2006.01)
*H02M 1/08* (2006.01)
*H02M 1/00* (2006.01)

(52) U.S. Cl.
CPC ............ *H02M 3/158* (2013.01); *H02M 1/08* (2013.01); *H02M 2001/009* (2013.01)

(58) Field of Classification Search
None
See application file for complete search history.

(56) References Cited

U.S. PATENT DOCUMENTS

| 8,749,213 B2 * | 6/2014 | Chen | H02M 3/1584 323/267 |
| 2005/0104565 A1 * | 5/2005 | Nagaoka | H02M 3/158 323/222 |

(Continued)

OTHER PUBLICATIONS

MA D., et al., "A Pseudo-CCM/DCM SIMO Switching Converter With Freewheel Switching", IEEE Journal of Solid-State Circuits, Jun. 2003, vol. 38, No. 6, pp. 1007-1014.

(Continued)

*Primary Examiner* — Jeffrey A Gblende
(74) *Attorney, Agent, or Firm* — Loza & Loza LLP (57) ABSTRACT

A power converter includes a voltage source for generating an input voltage, and a regulation circuit for generating a set of output voltages based on the input voltage. The regulation circuit regulates the set of output voltages in different manners based on whether the set of output voltages is greater or less than a set of corresponding reference voltages, respectively. If one or more output voltages are less than one or more of the corresponding reference voltages, the regulation circuit regulates only those one or more output voltages during a current regulation interval based on an error voltage related to one or more differences between the one or more output voltages and the corresponding one or more reference voltages, respectively. If all output voltages are greater than the corresponding reference voltages, the regulation circuit regulates only the output voltage associated with the largest load current during the current regulation interval.

26 Claims, 7 Drawing Sheets

(56) References Cited

U.S. PATENT DOCUMENTS

| | | | |
|---|---|---|---|
| 2009/0195071 A1* | 8/2009 | Furuse | H02M 1/44 307/31 |
| 2010/0181981 A1* | 7/2010 | Takemura | H02M 3/158 323/282 |
| 2012/0001610 A1* | 1/2012 | Klein | H02M 3/1582 323/284 |
| 2013/0235016 A1* | 9/2013 | Seo | G09G 3/3208 345/212 |
| 2019/0068051 A1* | 2/2019 | Yang | H02M 1/00 |

OTHER PUBLICATIONS

Trevisan D., et al., "Digital Control of Single-Inductor Dual-Output DC-DC Converters in Continuous-Conduction Mode," IEEE 36th Power Electronics Specialists Conference, 2005, pp. 2616-2622.

* cited by examiner

| VOK1 | VOK2 | VLM | S4 | S5 |
|---|---|---|---|---|
| 0 | 0 | N/A | ON | ON |
| 1 | 0 | N/A | OFF | ON |
| 0 | 1 | N/A | ON | OFF |
| 1 | 1 | 1 | ON | OFF |
| 1 | 1 | 0 | OFF | ON |

SWITCHED COMMON-MODE CURRENT CONTROL FOR SINGLE-INDUCTOR-MULTIPLE-OUTPUT (SIMO) POWER CONVERTERS

CROSS-REFERENCE TO RELATED APPLICATION

This application claims the benefit of the filing date of U.S. Provisional Application, Ser. No. 62/725,037, filed on Aug. 30, 2018, which is incorporated herein by reference.

FIELD

Aspects of the present disclosure relate generally to power converters, and in particular, to a switched common-mode current control for single-inductor-multiple-output (SIMO) power converters.

DESCRIPTION OF RELATED ART

In certain applications, there is a need for regulating a set of output voltages applied across a set of loads, respectively. For circuit space efficiency and/or other reasons, power converters have been designed using a single inductor for regulating a set of output voltages. In such power converters, there is a desire to regulate the set of output voltages in an accurate and power efficient manner.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus including a voltage source configured to generate an input voltage; and a regulation circuit configured to generate a set of output voltages based on the input voltage, wherein the regulation circuit is configured to regulate the set of output voltages in different manners based on whether the set of output voltages are greater or less than a set of corresponding reference voltages, respectively.

Another aspect of the disclosure relates to a method including generating an input voltage; generating a set of output voltages based on the input voltage; and regulating the set of output voltages in different manners based on whether the set of output voltages are greater or less than a set of corresponding reference voltages, respectively.

Another aspect of the disclosure relates to an apparatus including means for generating an input voltage; means for generating a set of output voltages based on the input voltage; and means for regulating the set of output voltages in different manners based on whether the set of output voltages are greater or less than a set of corresponding reference voltages, respectively.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1A:
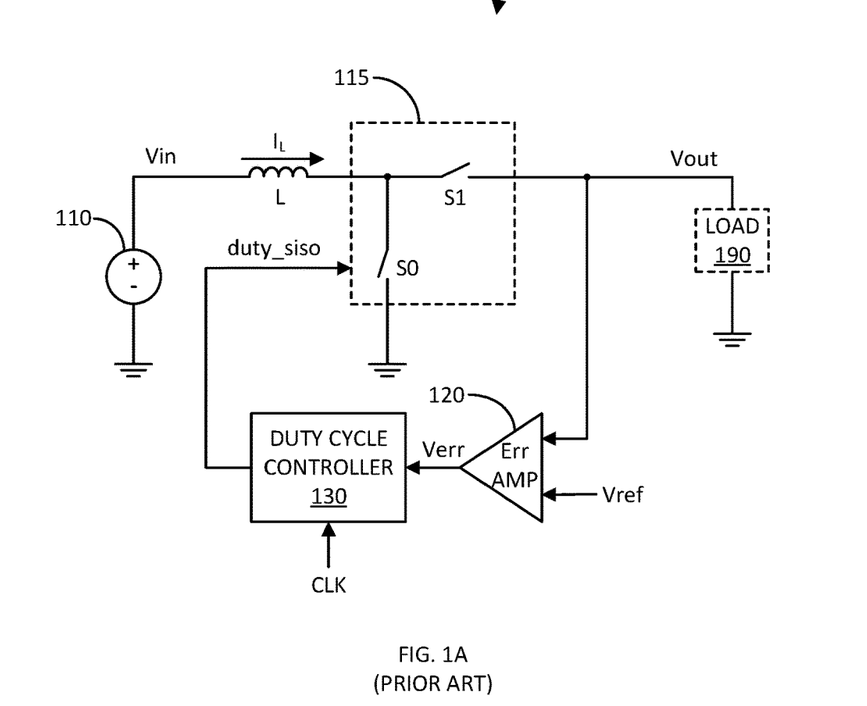
FIG. 1A illustrates a schematic diagram of an exemplary prior art switched-mode, single-inductor-single-output (SISO) power converter.

FIG. 1A illustrates a schematic diagram of an exemplary prior art switched-mode, single-inductor-single-output (SISO) power converter 100. The power converter 100 includes a voltage source 110 and a regulation circuit including an inductor L, a switching network 115 including switches S0 and S1, an error amplifier 120, and a duty cycle controller 130. The regulation circuit processes an input voltage Vin generated by the voltage source 110 to generate and regulate an output voltage Vout for a load 190.

The voltage source 110, which may be configured as a battery or other type of voltage source, generates the input voltage Vin at its positive terminal, and includes a negative terminal coupled to ground. The inductor L is coupled between the positive terminal of the voltage source 110 and a first terminal of switch S1. The switch S1 includes a second terminal coupled to an output of the power converter 100 (the node at which the output voltage Vout is generated). The load 190 is coupled between the output of the power converter 100 and ground. The switch S0 is also coupled between the first terminal of switch S1 output of the power converter 100 and ground.

The error amplifier 120 includes a first input configured to receive the output voltage Vout, and a second input configured to receive a reference voltage Vref. The reference voltage Vref is the target voltage for the output voltage Vout. The error amplifier 120 generates an error voltage Verr related to a difference between the output voltage Vout and the reference voltage Vref. The duty cycle controller 130, which receives a substantially periodic clock CLK, generates a control signal duty_siso for controlling the duty cycle $\Delta T_{S0}/T_{CLK}$ associated with the switches S0 and S1 turned on and off based on the error voltage Verr, respectively.

Figure 1B:
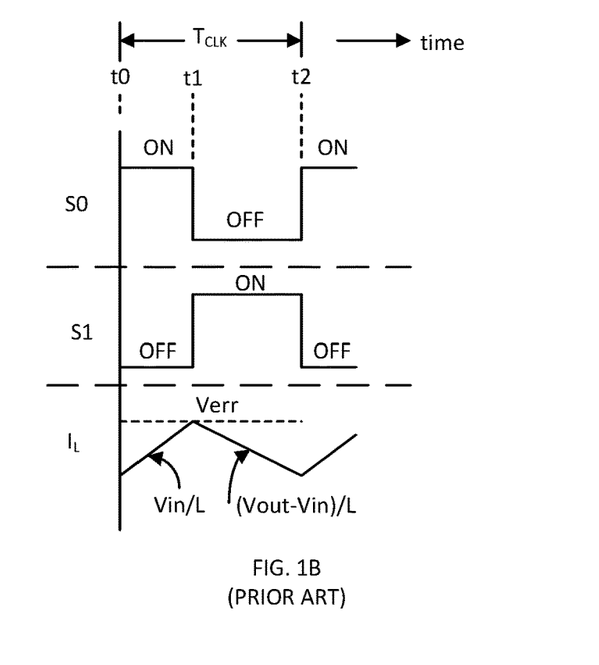
FIG. 1B illustrates a timing diagram of exemplary states of switches and inductor current associated with an operation of the prior art power converter of FIG. 1A.

FIG. 1B illustrates a timing diagram of exemplary states of the switches S0 and S1 and the current $I_L$ flowing through the inductor L associated with the operation of the prior art power converter 100. At time t0 or the beginning of a regulation clock period $T_{CLK}$, the duty cycle controller 130 generates the control signal duty_siso to turn on the switch S0 and turn off switch S1. While the switches S0 and S1 are respectfully turned on and off, a current $I_L$ flowing through the inductor L increases with a slope related to Vin/L, where L is the inductance of the inductor L. The rising inductor current $I_L$ causes the inductor L to store energy in the form of a magnetic field.

At time t1, the duty cycle controller 130 generates the control signal duty_siso to turn off the switch S0 and turn on switch S1. The duty cycle $\Delta T_{S0}/T_{CLK}$ or duration of the time interval t0-t1 is related to the error voltage Verr. For example, if the error voltage Verr is small, the duty cycle $\Delta T_{S0}/T_{CLK}$ is small so as not to generate a lot of magnetic energy stored in the inductor L. Conversely, if the error voltage Verr is large, the duty cycle $\Delta T_{S0}/T_{CLK}$ is large to generate a lot of magnetic energy stored in the inductor L.

During time interval t1-t2 or the remaining time interval of the clock period $T_{CLK}$, the duty cycle controller 130 generates the control signal duty_siso to maintain switch S0 turned off and switch S1 turned on. The stored magnetic energy created in the inductor L during time interval t1-t2 produces an inductor current $I_L$ that decreases with a slope related to (Vout−Vin)/L. As switch S1 is turned on, the current $I_L$ flows to the output so as to change the output voltage Vout by an amount related to the error voltage Verr. This results in the output voltage Vout being regulated to be substantially equal to the reference voltage Vref. The above cycle is repeated to maintain the output voltage Vout substantially equal to the reference voltage Vref.

Because, in power converter 100, there is a single inductor and a single output, the regulation of the output voltage Vout as discussed is pretty straight forward and operates well. However, there are power converters that include a single inductor but has multiple outputs (referred to herein as single-inductor-multiple-output (SIMO) power converters), where the regulation of multiple output voltages presents complexity and compromises to a designer. For example, some SIMO power converters regulate the multiple output voltages with the acceptance of common-mode errors in the output voltages. Other SIMO power converters regulate the multiple output voltages with substantially no common-mode error in the output voltages, but with a reduction in power conversion efficiency. A couple of exemplary power converters with the above attributes are discussed below, respectively.

Figure 2A:
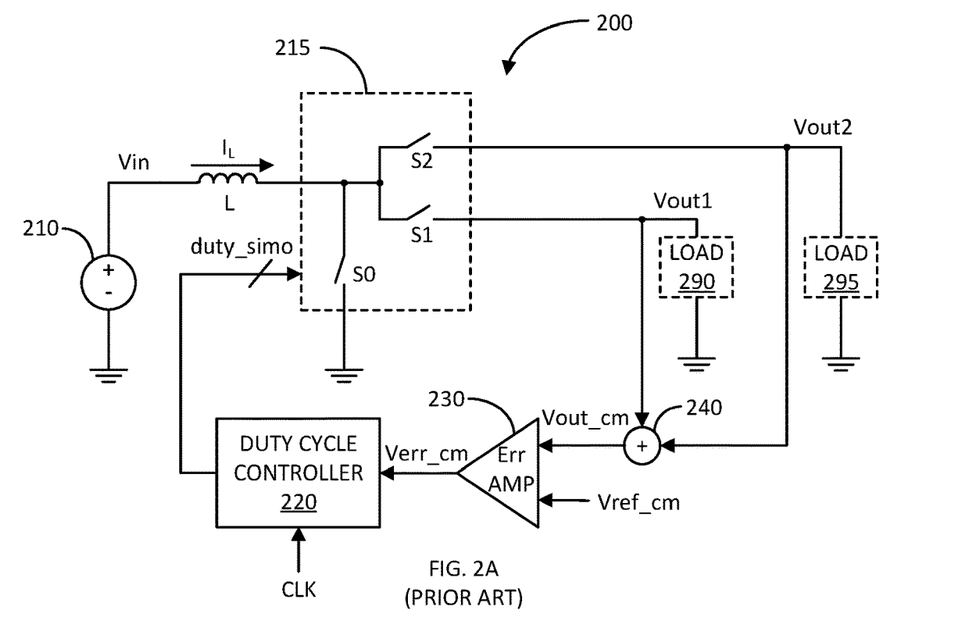
FIG. 2A illustrates a schematic diagram of an exemplary prior art common-mode current control, single-inductor-multiple-output (SIMO) power converter.

FIG. 2A illustrates a schematic diagram of an exemplary prior art common-mode current control, single-inductor-multiple-output (SIMO) power converter 200. The power converter 200 includes a voltage source 210 and a regulation circuit including an inductor L, a switching network 215 including switches S0, S1 and S2, a summing device 240, an error amplifier 230, and a duty cycle controller 220. The regulation circuit processes an input voltage Vin generated by the voltage source 210 to generate and regulate a pair of output voltages Vout1 and Vout2 for a pair of loads 290 and 295, respectively.

The voltage source 210, which may be configured as a battery or other type of voltage source, generates the input voltage Vin at its positive terminal, and includes a negative terminal coupled to ground. The inductor L is coupled between the positive terminal of the voltage source 210 and respective first terminals of switches S1 and S2. The switches S1 and S2 include second terminals coupled to first and second outputs of the power converter 200 (the nodes at which the first and second output voltages Vout and Vout2 are generated, respectively). The first load 290 is coupled between the first output of the power converter 200 and ground. The second load 295 is coupled between the second output of the power converter 200 and ground. The switch S0 is coupled between the respective first terminals of the switches S1 and S2 and ground.

The summing device 240 sums the first and second output voltages Vout1 and Vout2 to generate a common-mode output voltage Vout_cm. The error amplifier 230 includes a first input configured to receive the common-mode output voltage Vout_cm, and a second input configured to receive a common-mode reference voltage Vref_cm. The common mode reference voltage Vref_cm may be related or equal to the sum of a first reference voltage Vref1 and a second reference voltage Vref2. The first reference voltage Vref1 is the target voltage for the first output voltage Vout1. The second reference voltage Vref2 is the target voltage for the second output voltage Vout2.

The error amplifier 230 generates a common-mode error voltage Verr_cm related to a difference between the common-mode output voltage Vout_cm and the common-mode reference voltage Vref_cm.

The duty cycle controller 220, which receives a substantially periodic clock CLK, generates a control signal duty_simo for controlling the duty cycle $\Delta T_{S0}/T_{CLK}$ associated with the switches S0 and S1 turned on and off and switches S0 and S2 turned on and off in two consecutive periods of the clock CLK based on the common-mode error voltage Verr_cm, respectively.

Figure 2B:
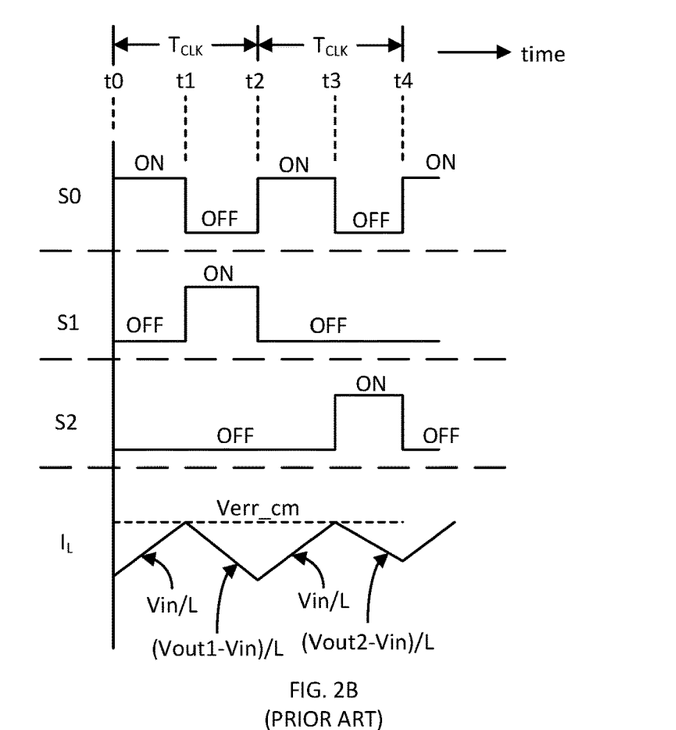
FIG. 2B illustrates a timing diagram of exemplary states of switches and inductor current associated with an operation of the prior art power converter of FIG. 2A.

FIG. 2B illustrates a timing diagram of exemplary states of switches S0, S1, and S2 and inductor current $I_L$ associated with an operation of the prior art power converter 200. At time t0 or the beginning of the first clock period $T_{CLK}$, the duty cycle controller 220 generates the control signal duty_simo to turn on the switch S0 and turn off switches S1 and S2. While the switches S0 and S1-S2 are respectfully turned on and off, a current $I_L$ flowing through the inductor L increases with a slope related to Vin/L, where L is the inductance of the inductor L. The rising inductor current $I_L$ causes the inductor L to store energy in the form of magnetic flux.

At time t1, the duty cycle controller 220 generates the control signal duty_simo to turn off the switch S0 and turn on switch S, while maintaining switch S2 turned off. The duration of the time interval t0-t1 or duty cycle $\Delta T_{S0}/T_{CLK}$ is related to the common-mode error voltage Verr_cm. During time interval t1-t2 or the remaining time interval of the first clock period $T_{CLK}$, the duty cycle controller 220 generates the control signal duty_simo to maintain switches S0 and S2 turned off and switch S1 turned on. The stored magnetic flux created in the inductor L during time interval t0-t1 produces an inductor current $I_L$ that decreases with a slope related to (Vout1−Vin)/L. As switch S1 is turned on, the current $I_L$ flows to the first output so as to change the first output voltage Vout1 by an amount related to the common-mode error voltage Verr_cm.

At time t2 or the start of the second clock period $T_{CLK}$, the duty cycle controller 220 generates the control signal duty_simo to turn on the switch S0 and turn off switches S1 and S2. While the switches S0 and S1-S2 are respectfully turned on and off, a current $I_L$ flowing through the inductor L increases with a slope related to Vin/L, where L is the inductance of the inductor L. The rising inductor current $I_L$ causes the inductor L to store energy in the form of magnetic flux.

At time t3, the duty cycle controller 220 generates the control signal duty_simo to turn off the switch S0 and turn on switch S2, while maintaining switch S turned off. The duration of the time interval t2-t3 or duty cycle $\Delta T_{S0}/T_{CLK}$ is related to the common-mode error voltage Verr_cm. During time interval t3-t4 or the remaining time interval of the second clock period $T_{CLK}$, the duty cycle controller 220 generates the control signal duty_simo to maintain switches S0 and S1 turned off and switch S2 turned on. The stored magnetic flux created in the inductor L during time interval t2-t3 produces an inductor current $I_L$ that decreases with a slope related to (Vout2−Vin)/L. As switch S2 is turned on, the current $I_L$ flows to the second output so as to change the second output voltage Vout2 by an amount related to the common-mode error voltage Verr_cm.

Because, during time intervals t0-t1 and t2-t3, the amount of magnetic flux stored in the inductor L is related to the common-mode error voltage Verr_cm, the releasing of the magnetic flux as an inductor current $I_L$ for the first and second loads 290 and 295 during time intervals t1-t2 and t3-t4, respectively, causes a change in the first and second output voltages Vout1 and Vout2 based on the common-mode error voltage Verr_cm. Since the regulation of the output voltages Vout1 and Vout2 is based on the common-error voltage Verr_cm, and not their respective single-ended error voltages (Vout1−Vref1) and (Vout2−Vref2), the regulation of the output voltages Vout1 and Vout2 does not necessarily cause the voltages Vout1 and Vout2 to be regulated to Vref1 and Vref2, respectively. Rather, the regulation of the first output voltage Vout1 is to Vref1−ΔV and the regulation of the second output voltage Vout2 is to Vref2+ΔV, or vice-versa; the error ΔV being significant especially when load currents are highly unbalanced. This is referred to as "cross regulation," and results in errors in the output voltages Vout1 and Vout2.

Figure 3A:
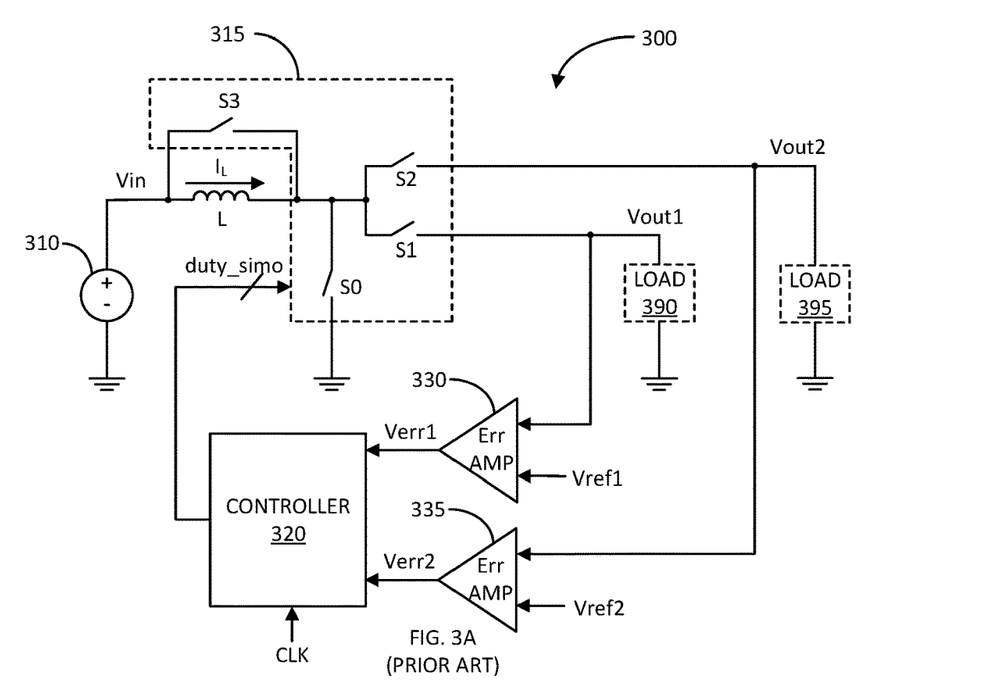
FIG. 3A illustrates a schematic diagram of another exemplary prior art current control, single-inductor-multiple-output (SIMO) power converter.

FIG. 3A illustrates a schematic diagram of another exemplary prior art current control, single-inductor-multiple-output (SIMO) power converter 300. The power converter 300 includes a voltage source 310 and a regulation circuit including an inductor L, a switching network 315 including switches S0, S1, S2, and S3, a first error amplifier 330, a second error amplifier 335, and a duty cycle controller 320. The regulation circuit processes an input voltage Vin generated by the voltage source 310 to generate and regulate a pair of output voltages Vout1 and Vout2 for a pair of loads 390 and 395, respectively.

The voltage source 310, which may be configured as a battery or other type of voltage source, generates the input voltage Vin at its positive terminal, and includes a negative terminal coupled to ground. The inductor L is coupled between the positive terminal of the voltage source 310 and respective first terminals of switches S1 and S2. The switches S1 and S2 include second terminals coupled to first and second outputs of the power converter 300 (the nodes at which the first and second output voltages Vout and Vout2 are generated, respectively). The first load 390 is coupled between the first output of the power converter 300 and ground. The second load 395 is coupled between the second output of the power converter 300 and ground. The switch S0 is coupled between the respective first terminals of the switches S1 and S2 and ground. The switch S3 is coupled across the inductor L.

The first error amplifier 330 includes a first input configured to receive the first output voltage Vout1, and a second input configured to receive a first reference voltage Vref1. The first reference voltage Vref1 is the target voltage for the first output voltage Vout1. The first error amplifier 330 generates a first error voltage Verr1 related to a difference between the first output voltage Vout1 and the first reference voltage Vref1.

The second error amplifier 335 includes a first input configured to receive the second output voltage Vout2, and a second input configured to receive a second reference voltage Vref2. The second reference voltage Vref2 is the target voltage for the second output voltage Vout2. The second error amplifier 335 generates a second error voltage Verr2 related to a difference between the second output voltage Vout2 and the second reference voltage Vref2.

The duty cycle controller 320, which receives a substantially periodic clock CLK, generates a control signal duty_simo for controlling the duty cycle $\Delta T_{S0}/T_{CLK}$ associated with the switches S0 and S1 turned on and off and switches S0 and S2 turned on and off in two consecutive periods of the clock based on the first and second error voltages Verr1 and Verr2, respectively. As discussed below, each clock period includes a freewheeling interval.

Figure 3B:
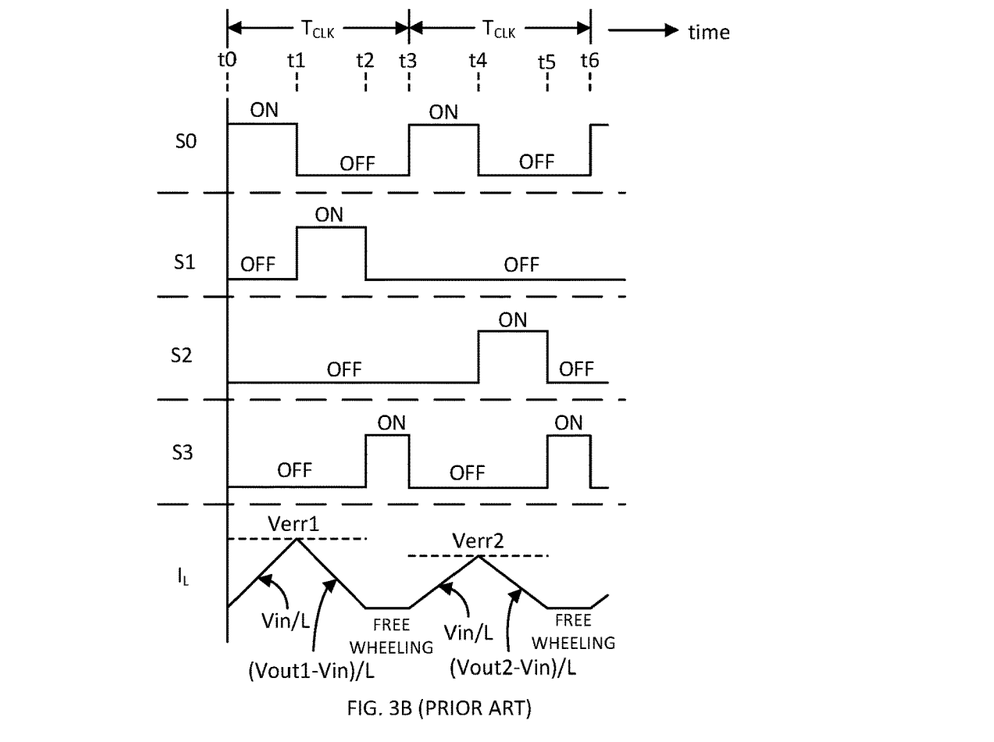
FIG. 3B illustrates a timing diagram of exemplary states of switches and inductor current associated with an operation of the prior art power converter of FIG. 3A.

FIG. 3B illustrates a timing diagram of exemplary states of switches S0, S1, S2, and S3 and inductor current $I_L$ associated with an operation of the prior art power converter 300. At time t0 or the start of the first clock period $T_{CLK}$, the duty cycle controller 320 generates the control signal duty_simo to turn on the switch S0 and turn off switches S1, S2 and S3. While the switches S0 and S1-S3 are respectfully turned on and off during time interval t0-t1, a current $I_L$ flowing through the inductor L increases with a slope related to Vin/L, where L is the inductance of the inductor L. The rising inductor current $I_L$ causes the inductor L to store energy in the form of magnetic flux.

At time t1, the duty cycle controller 320 generates the control signal duty_simo to turn off the switch S0 and turn on switch S1, while maintaining switches S2 and S3 turned off. The duration of the time interval t0-t1 or duty cycle $\Delta T_{S0}/T_{CLK}$ is related to the first error voltage Verr1. During time interval t1-t2, the duty cycle controller 320 generates the control signal duty_simo to maintain switches S0, S2, and S3 turned off and switch S turned on. The stored magnetic flux created in the inductor L during time interval t0-t1 produces an inductor current $I_L$ that decreases with a slope related to (Vout1−Vin)/L. As switch S1 is turned on, the current $I_L$ flows to the first output so as to change the first output voltage Vout1 by an amount related to the first error voltage Verr1.

At time t2, the duty cycle controller 320 generates the control signal duty_simo to turn on the switch S3, turn off switch S1, and maintain switches S0 and S2 turned off. While the switches S3 and S0-S2 are respectfully turned on and off during time interval t2-t3 or the remaining time interval of the first clock period $T_{CLK}$, the switch S3 shorts out the inductor L. This interval t2-t3 is referred to as the "freewheeling" interval.

At time t3 or the start of the second clock period $T_{CLK}$, the duty cycle controller 320 generates the control signal duty_simo to turn on the switch S0 and turn off switches S1, S2 and S3. While the switches S0 and S1-S3 are respectfully turned on and off during time interval t3-t4, a current $I_L$ flowing through the inductor L increases with a slope related to Vin/L, where L is the inductance of the inductor L. The rising inductor current $I_L$ causes the inductor L to store energy in the form of magnetic flux.

At time t4, the duty cycle controller 320 generates the control signal duty_simo to turn off the switch S0 and turn on switch S2, while maintaining switches S1 and S3 turned off. The duration of the time interval t3-t4 or $\Delta T_{S0}/T_{CLK}$ is related to the second error voltage Verr2. During time interval t4-t5, the duty cycle controller 320 generates the control signal duty_simo to maintain switches S0, S1, and S3 turned off and switch S2 turned on. The stored magnetic flux created in the inductor L during time interval t3-t4 produces an inductor current $I_L$ that decreases with a slope related to (Vout2−Vin)/L. As switch S2 is turned on, the current $I_L$ flows to the second output so as to change the second output voltage Vout2 by an amount related to the second error voltage Verr2.

At time t5, the duty cycle controller 320 generates the control signal duty_simo to turn on the switch S3, turn off switch S1, and maintain switches S0 and S2 turned off. While the switches S3 and S0-S2 are respectfully turned on and off during time interval t5-t6 or the remaining time interval of the second clock period $T_{CLK}$, the switch S3 shorts out the inductor L. This interval is another "freewheeling" interval.

In comparison with power converter 200, the power converter 300 regulates the first and second output voltages Vout1 and Vout2 to the references voltages Vref1 and Vref2 with more accuracy, respectfully. This is because the "freewheeling" period effectively isolates the regulation interval (t0-t3) of the first output voltage Vout1 from the regulation interval (t3-t6) of the second output voltage Vout2; thereby effectively eliminating cross regulation. However, the power conversion efficiency in power converter 300 is reduced due to the power consumed during the "freewheeling" period via the current flowing through the switch S3 without contributing to the generation of the first and second output voltages Vout1 and Vout2.

Figure 4A:
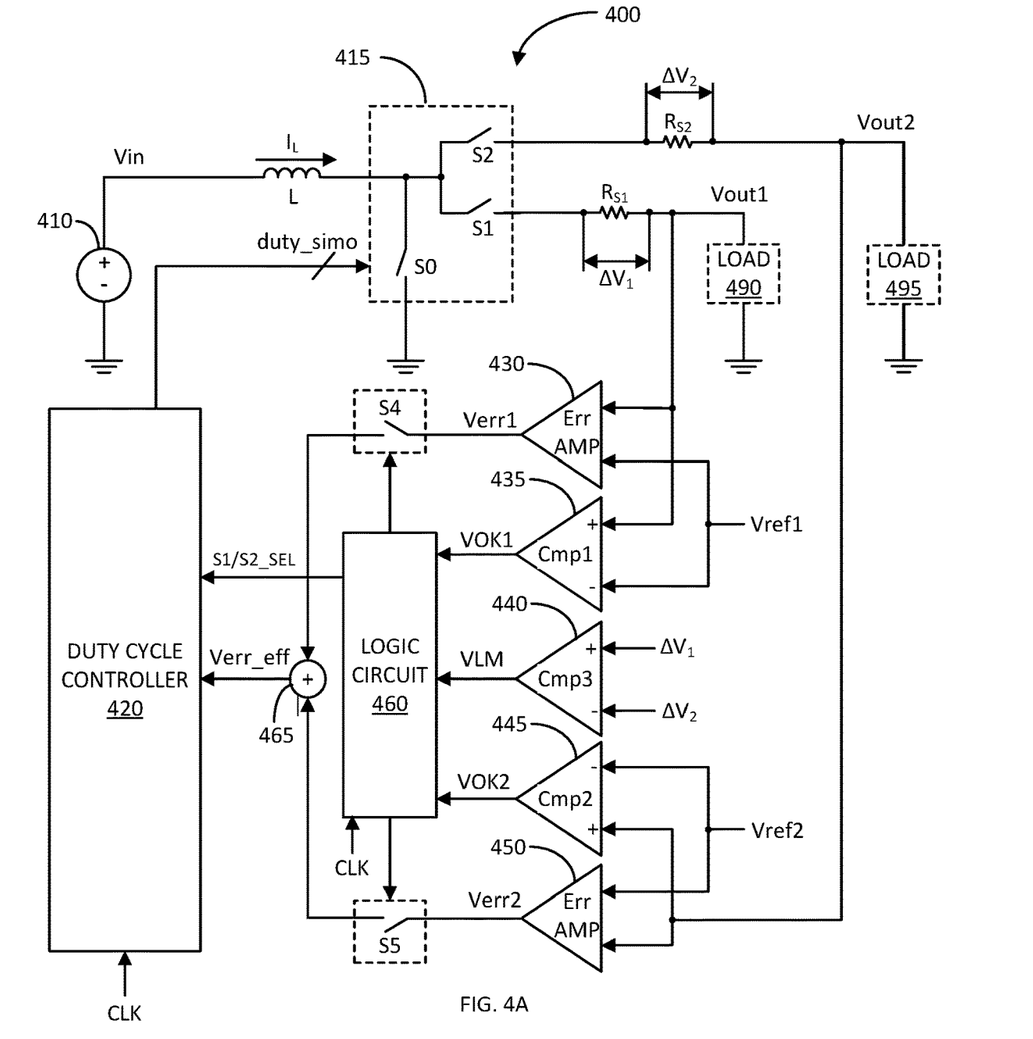
FIG. 4A illustrates a schematic diagram of another exemplary switched common-mode current control, single-inductor-multiple-output (SIMO) power converter in accordance with another aspect of the disclosure.

FIG. 4A illustrates a schematic diagram of another exemplary switched common-mode current control, single-inductor-multiple-output (SIMO) power converter 400 in accordance with another aspect of the disclosure.

In summary, the power converter 400 regulates first and second output voltages as follows:

If the first and second output voltages Vout1 and Vout2 are both less than the first and second reference voltages Vref1 and Vref2, respectively, the regulation of the output voltages Vout1 and Vout2 is based on a common-mode error voltage and performed over two consecutive clock periods, respectively. Thus, the regulation interval for this case may be two clock periods in duration.

If the first output voltage Vout1 is greater than the first reference voltage Vref1, and the second output voltage Vout2 is less than the second reference voltage Vref2, the regulation of the first output voltage Vout is skipped and the regulation of the second output voltage Vout2 is based on the second error voltage Verr2 and performed over a single clock period. Thus, the regulation interval for this case may be a single period cycle in duration.

If the first output voltage Vout1 is less than the first reference voltage Vref1, and the second output voltage Vout2 is greater than the second reference voltage Vref2, the regulation of the second output voltage Vout2 is skipped and the regulation of the first output Vout1 is based on the first error voltage Verr1 and performed over a single clock cycle. Thus, the regulation interval for this case may be a single clock period in duration.

If the first and second output voltages Vout1 and Vout2 are both greater the first and second reference voltages Vref1 and Vref2, respectively, the regulation of the output voltage (Vout1 or Vout2) associated with a lower load current is skipped, and the regulation of the output voltage (Vout2 or Vout1) is based on the error voltage (Verr2 or Verr1) associated with the load drawing a higher current and performed over a single clock period. Thus, the regulation interval for this case may be a single clock cycle in duration.

In particular, the power converter 400 includes a voltage source 410 and a regulation circuit including an inductor L, a switching network 415 including switches S0, S1, and S2, a first current-sense resistor $R_{S1}$, and a second current-sense resistor $R_{S2}$. The regulation circuit further includes a first error amplifier 430, a second error amplifier 450, a first comparator 435, a second comparator 445, and a third comparator 440. Additionally, the regulation circuit includes a logic circuit 460, a fourth switch S4, a fifth switch S5, a summing device 465, and a duty cycle controller 420. The regulation circuit processes an input voltage Vin generated by the voltage source 410 to generate and regulate a pair of output voltages Vout1 and Vout2 for a pair of loads 490 and 495, respectively.

The voltage source 410, which may be configured as a battery or other type of voltage source, generates the input voltage Vin at its positive terminal, and includes a negative terminal coupled to ground. The inductor L is coupled between the positive terminal of the voltage source 410 and respective first terminals of switches S1 and S2. The first and second current-sensing resistors $R_{S1}$ and $R_{S2}$ are coupled between respective second terminals of the switches S1 and S2 and the first and second outputs of the power converter 400 (the nodes at which the first and second output voltages Vout1 and Vout2 are generated, respectively). The first load 490 is coupled between the first output of the power converter 400 and ground. The second load 495 is coupled between the second output of the power converter 400 and ground. The switch S0 is coupled between the respective first terminals of the switches S1 and S2 and ground.

The first error amplifier 430 includes a first input configured to receive the first output voltage Vout1, and a second input configured to receive a first reference voltage Vref1. The first reference voltage Vref1 is the target voltage for the first output voltage Vout1. The first error amplifier 430 generates a first error voltage Verr1 related to a difference between the first output voltage Vout1 and the first reference voltage Vref1.

Similarly, the second error amplifier 450 includes a first input configured to receive the second output voltage Vout2, and a second input configured to receive a second reference voltage Vref2. The second reference voltage Vref2 is the target voltage for the second output voltage Vout2. The second error amplifier 450 generates a second error voltage Verr2 related to a difference between the second output voltage Vout2 and the second reference voltage Vref2.

The first comparator 435 includes a first (e.g., positive) input configured to receive the first output voltage Vout1, and a second (e.g., negative) input configured to receive the first reference voltage Vref1. The first comparator 435 generates a signal VOK1 indicating whether the first output voltage Vout1 is greater than the first reference voltage Vref1. In this example, if the first output voltage Vout1 is greater than the first reference voltage Vref1, the first comparator 435 generates the signal VOK1 at a high logic level (e.g., a logic one (1)). If the first output voltage Vout1 is less than the first reference voltage Vref1, the first comparator 435 generates the signal VOK1 at a low logic level (e.g., a logic zero (0)).

Similarly, the second comparator 445 includes a first (e.g., positive) input configured to receive the second output voltage Vout2, and a second (e.g., negative) input configured to receive the second reference voltage Vref2. The second comparator 445 generates a signal VOK2 indicating whether the second output voltage Vout2 is greater than the second reference voltage Vref2. In this example, if the second output voltage Vout2 is greater than the second reference voltage Vref2, the second comparator 445 generates the signal VOK2 at a high logic level (e.g., a logic one (1)). If the second output voltage Vout2 is less than the second reference voltage Vref2, the second comparator 445 generates the signal VOK2 at a low logic level (e.g., a logic zero (0)).

The third comparator 440 includes a first (e.g., positive) input configured to receive a voltage $\Delta V_1$ across the first current-sense resistor $R_{S1}$, and a second (e.g., negative) input configured to a voltage $\Delta V_2$ across the second current-sense resistor $R_{S2}$. The voltage $\Delta V_1$ is related to the current being supplied to the first load 490, and the voltage $\Delta V_2$ is related to the current being supplied to the second load 495. The third comparator 440 generates a signal VLM indicating whether the voltage $\Delta V_1$ is greater than the voltage $\Delta V_2$. In other words, the signal VLM indicates which of the loads 490 or 495 is drawing more current. In this example, if the voltage $\Delta V_1$ is greater than the voltage $\Delta V_2$, the third comparator 440 generates the signal VLM at a high logic level (e.g., a logic one (1)). If the voltage $\Delta V_1$ is less than the voltage $\Delta V_2$, the third comparator 440 generates the signal VLM at a low logic level (e.g., a logic zero (0)).

The logic circuit 460 synchronously controls the ON/OFF states of the fourth and fifth switches S4-S5 and the first and second switches S1 and S2 via the S1/S2_SEL signal based on the signals VOK1, VOK2, and VLM and a clock CLK, as discussed in more detail below. The summing device 465 generates an effective error voltage Verr_eff based on the first error voltage Verr1, the second error voltage Verr2, or the sum of the first and second error voltages Verr1 and Verr2, based on the states of the signals VOK1, VOK2, and VLM.

The duty cycle controller 420, which receives the substantially periodic clock CLK and the S1/S2_SEL signal, generates a control signal duty_simo for controlling the duty cycle $\Delta T_{S0}/T_{CLK}$ associated with the switches S0 and S1 or S2 turned on and off in a first clock cycle based on the effective error voltage Verr_eff, and the switches S0 and S2 if a second clock cycle is required based on the effective error voltage Verr_eff, respectively.

Figure 4B:
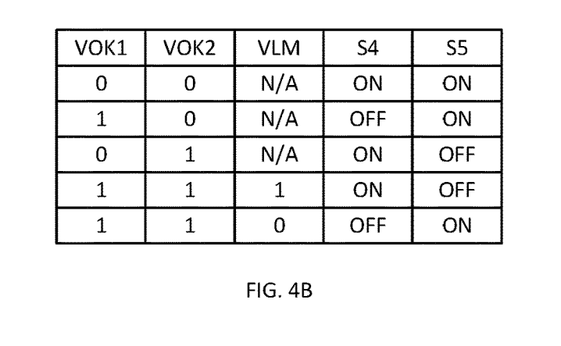
FIG. 4B illustrates a table of states of various signals and switches associated with an operation of the power converter of FIG. 4A in accordance with another aspect of the disclosure.

FIG. 4B illustrates a table for explaining an operation of the logic circuit 460 in accordance with another aspect of the disclosure.

According to the table, if the signals VOK1 and VOK2 are both at logic zeros (0s) (meaning that the first and second output voltages Vout1 and Vout2 are less than the first and second reference voltages Vref1 and Vref2, respectively), the logic circuit 460, at the beginning of the first clock cycle, turns on switches S4 and S5 regardless of the state of the VLM signal. In this scenario, the summing device 465 generates the effective error voltage Verr_eff as substantially the common-mode error voltage Verr_cm associated with the first and second output voltages Vout1 and Vout2 throughout the first and second clock cycles. At the beginning of the first clock cycle, the logic circuit 560 configures the S1/S2_SEL signal to select S1 for regulation of the first output voltage Vout1 during the first clock cycle, then configures the S1/S2_SEL signal to select S2 for regulation of the second output voltage Vout2 during the second clock cycle.

If the signal VOK1 is at a logic one (1) and the signal VOK2 is at a logic zero (0) (meaning that the first output voltage Vout1 is greater than the first reference voltage Vref1 and the second output voltage Vout2 is less than the second reference voltage Vref2), the logic circuit 460, at the beginning of the single-clock-cycle regulation interval, turns off switch S4 and turns on switch S5 regardless of the state of the VLM signal. In this scenario, the summing device 465 generates the effective error voltage Verr_eff as substantially the second error voltage Verr2. Also, at the beginning of the single clock cycle, the logic circuit 560 configures the S1/S2_SEL signal to select S2 for regulation of the second output voltage Vout2 during the single clock cycle. As discussed, the regulation of the first output voltage Vout1 is skipped during this regulation interval.

Similarly, if the signal VOK1 is at a logic zero (0) and the signal VOK2 is at a logic one (1) (meaning that the first output voltage Vout1 is less than the first reference voltage Vref1 and the second output voltage Vout2 is greater than the second reference voltage Vref2), the logic circuit 460, at the beginning of the single-clock-cycle regulation interval, turns on switch S4 and turns off switch S5 regardless of the state of the VLM signal. In this scenario, the summing device 465 generates the effective error voltage Verr_eff as substantially the first error voltage Verr1. Also, at the beginning of the single clock cycle, the logic circuit 560 configures the S1/S2_SEL signal to select S1 for regulation of the first output voltage Vout1 during the single clock cycle. As discussed, the regulation of the second output voltage Vout2 is skipped during this regulation interval.

If the signals VOK1 and VOK2 are both at logic ones (1s) (meaning that the first and second output voltages Vout1 and Vout2 are greater than the first and second reference voltages Vref1 and Vref2, respectively), the logic circuit 460, at the beginning of the single-clock-cycle regulation interval, turns on S4 or S5 based on the state of the VLM signal.

For instance, if the VLM signal is at a logic one (1) (meaning that the first load 490 is drawing more current than the second load 495), the logic circuit 460 turns on switch S4 and turns off switch S5. In this scenario, the summing device 465 generates the effective error voltage Verr_eff as substantially the first error voltage Verr1. If the VLM signal is at a logic zero (0) (meaning that the second load 495 is drawing more current than the first load 490), the logic circuit 460 turns off switch S4 and turns off switch S5. In this scenario, the summing device 465 generates the effective error voltage Verr_eff as substantially the second error voltage Verr2.

Also, at the beginning of the single clock cycle, the logic circuit 560 configures the S1/S2_SEL signal to select S1 or S2 for regulation of the first or second output voltage Vout1 or Vout2 during the single clock cycle. As discussed, the regulation of the output voltage associated with the smaller load current is skipped during this regulation interval.

Thus, if the signals VOK1 and VOK2 are both logic zeros (0s), the operation of the power converter 400 is in accordance with regulating both output voltages Vout and Vout2 over two consecutive clock cycles based on the common-mode error voltage Verr_cm as depicted in FIG. 2B.

If the signal VOK1 is at a logic one (1) and VOK2 is at a logic zero (0), the operation of the power converter 400 is in accordance with regulating only the second output voltage Vout2 over a single clock cycle based on the second error voltage Verr2 as depicted in FIG. 1B, and skipping the regulation of the first output voltage Vout1 for this regulation interval.

If the signal VOK1 is at a logic zero (0) and VOK2 is at a logic one (1), the operation of the power converter 400 is in accordance with regulating only the first output voltage Vout1 over a single clock cycle based on the first error voltage Verr1 as depicted in FIG. 1B, and skipping the regulation of the second output voltage Vout2 for this regulation interval.

If the signals VOK1 and VOK2 are both logic ones (1s), the operation of the power converter 400 is in accordance with regulating only the output voltage Vout1 or Vout2 over a single clock cycle as depicted in FIG. 1B, based on the error voltage Verr1 or Verr2 associated with the load 490 or 495 drawing the greater amount of current as indicated by voltages $\Delta V_1$ and $\Delta V_2$ across the current-sense resistor $R_{S1}$ and $R_{S2}$, respectively.

In comparison with power converter 300, the power converter 400 does not include a freewheeling interval. Thus, power converter 400 does not suffer from power efficiency reduction due to freewheeling intervals. The regulation inaccuracy by always using a common-mode error voltage as in power converter 200 is only present in power converter 400 when the first and second output voltages Vout1 and Vout2 are less than the first and second reference voltages Vref1 and Vref2, respectively. Otherwise, the error voltage associated with the output voltage to be regulated during the current regulation interval is used for more accuracy. Thus, overall, the power converter 400 provides a more accurate regulation of the first and second output voltages Vout and Vout2 compared to that of power converter 200.

Figure 5:
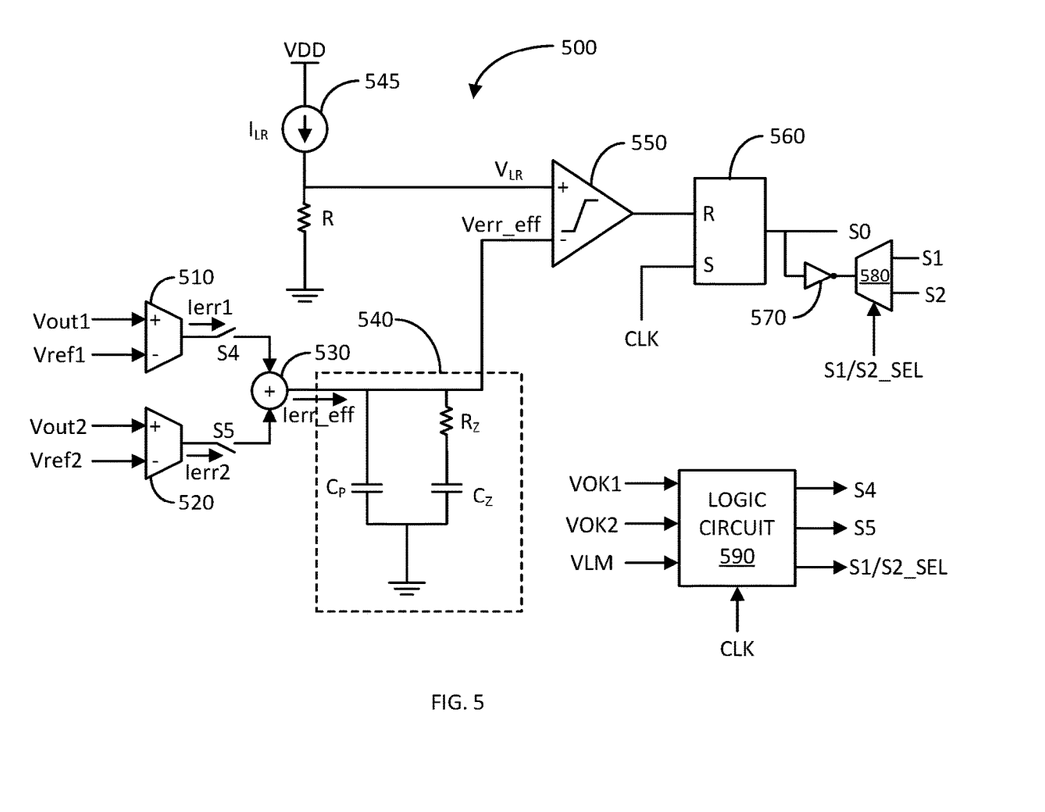
FIG. 5 illustrates a schematic diagram of an exemplary regulation circuit for controlling a timing of the closure of switches of a power converter in accordance with another aspect of the disclosure.

FIG. 5 illustrates a schematic diagram of an exemplary regulation circuit 500 for controlling the duty cycle associated with switches S0 and S1 or S2 of the power converter 400 in accordance with another aspect of the disclosure. The regulation circuit 500 is an exemplary more detailed implementation of a portion of the regulation circuit in power converter 400.

The regulation circuit 500 includes a first differential transconductance amplifier 510, a second differential transconductance amplifier 520, switches S4 and S5, current summer 530, compensation network 540, a current source 545, a resistor R, a pulse width modulator 550, an RS-flip-flop 560, an inverter 570, a demultiplexer 580, and a logic circuit 590.

The first differential transconductance amplifier 510 includes a positive input configured to receive the first output voltage Vout1, a negative input configured to receive the first reference voltage Vref1, and an output configured to generate a first error current Ierr1 related to a difference between the first output voltage Vout1 and the first reference voltage Vref1. The first differential transconductance amplifier 510 performs a similar operation as the first error amplifier 430 of power converter 400.

The second differential transconductance amplifier 520 includes a positive input configured to receive the second output voltage Vout2, a negative input configured to receive the second reference voltage Vref2, and an output configured to generate a second error current Ierr2 related to a difference between the second output voltage Vout2 and the second reference voltage Vref2. The second differential transconductance amplifier 520 performs a similar operation as the second error amplifier 450 of power converter 400.

The switches S4 and S5 are coupled between the outputs of the first and second differential transconductance amplifiers 510 and 520 and first and second inputs of the current summer 530. The ON/OFF states of the switches S4 and S5 are controlled by the logic circuit 590 in accordance with signals VOK1, VOK2, and VLM, as previously discussed with reference to logic circuit 460 of power converter 400. The current summer 530 sums the currents flowing into the first and second inputs of the current summer to generate an effective error current Ierr_eff. The current summer 530 performs a similar operation as the summing device 465 of power converter 400.

The compensation network 540 includes a parasitic capacitor $C_P$ coupled in parallel with a resistor $R_Z$ connected in series with a capacitor $C_Z$ between the output of the current summer 530 and ground. The effective error current Ierr_eff flows into the compensation network 540 to generate an effective error voltage Verr_eff. This effective error voltage Verr_eff corresponds to the effective error voltage Verr_eff described with reference to power converter 400.

The current source 545 and resistor R is coupled between an upper voltage rail VDD and ground. The current source 545 is configured to generate a replica current $I_{LR}$ related to the inductor current $I_L$ (e.g., a scaled version thereof generated via a current mirror). The replica current $I_{LR}$ flows through the resistor R to generate a voltage $V_{LR}$ related to the inductor current $I_L$. The voltages $V_{LR}$ and Verr_eff are applied to positive and negative inputs of the pulse width modulator 550.

The output of the pulse width modulator 550 is coupled to a reset (R) input of the RS-flip-flip 560. The clock CLK is applied to the set (S) input of the RS-flip-flop 560. The output of the RS-flip-flop 560 controls the ON/OFF state of the switch S0. The output of the RS-flip-flop 560 is coupled to an input of the inverter 570. The output of the inverter 570 is coupled to an input of the demultiplexer 580. The current source 545, resistor R, compensation network 540, pulse width modulator 550, RS-flip-flop 560, inverter 570, and demultiplexer 580 may be integrated in the duty cycle controller 420 of power converter 400.

The logic circuit 590 receives the signals VOK1, VOK2, and VLM and controls the switches S4 and S5 and the selection (S1/S2_SEL) performed by the demultiplexer 580 based on the clock CLK, as previously described with reference to power converter 400.

The operation of regulation circuit 500 is as follows: if VOK1 and VOK2 are both logic zeros (0s) at the beginning of a first regulation clock cycle, the logic circuit 590 turns on switches S4 and S5. Accordingly, the effective error voltage Verr_eff is based on the common-mode error voltage Verr_cm associated with the first and second output voltages Vout1 and Vout2. The effective error voltage Verr_eff is the threshold voltage for the pulse width modulator 550.

Further, at the beginning of the first regulation clock cycle, marked by the rising edge of the clock CLK, the RS-flip-flop 560 generates a high logic signal to turn on the switch S0 and cause the inductor current $I_L$ to rise with a slope of Vin/L. At such time, the logic circuit 590 has configured the demultiplexer 580 to select switch S1. Thus, the inverter 570 inverts the high logic signal from the RS-flip-flip 560 to generate a low logic signal. The demultiplexer 580 passes the low logic signal to turn off or maintain switch S1 off. The voltage $V_{LR}$ rises in accordance with the inductor current $I_L$.

When the voltage $V_{LR}$ reaches the effective error voltage Verr_eff, the pulse width modulator 550 transitions its output from a low logic signal to a high logic signal. The high logic signal resets the RS-flip-flop 560 causing it to output a low logic signal. The low logic signal turns off switch S0. The inverter 570 inverts the low logic signal to generate a high logic signal. The demultiplexer 580 passes the high logic signal to turn on switch S1. Thus, the magnetic energy stored in the inductor L due to the rising inductor current $I_L$ while switch S0 was on flows into the first load to change the first output voltage Vout1 by an amount related to the effective error voltage Verr_eff.

Since, when VOK1 and VOK2 are both logic zeros (0s), the regulation interval is two clock cycles. During the second regulation clock cycle, the effective error voltage Verr_eff remains the same as in the first regulation clock cycle. Accordingly, at the beginning of the second regulation clock cycle, marked by the rising edge of the clock CLK, the RS-flip-flop 560 generates a high logic signal to turn on the switch S0 and cause the inductor current $I_L$ to rise with a slope of Vin/L. At such time, the logic circuit 590 has now configured the demultiplexer 580 to select switch S2. Thus, the inverter 570 inverts the high logic signal from the RS-flip-flip 560 to generate a low logic signal. The demultiplexer 580 passes the low logic signal to turn off or maintain switch S2 off. The voltage $V_{LR}$ rises in accordance with the inductor current $I_L$.

When the voltage $V_{LR}$ reaches the effective error voltage Verr_eff, the pulse width modulator 550 transitions its output from a low logic signal to a high logic signal. The high logic signal resets the RS-flip-flop 560 causing it to output a low logic signal. The low logic signal turns off switch S0. The inverter 570 inverts the low logic signal to generate a high logic signal. The demultiplexer 580 passes the high logic signal to turn on switch S2. Thus, the magnetic energy stored in the inductor L due to the rising inductor current $I_L$ while switch S0 was on flows into the second load to change the second output voltage Vout2 by an amount related to the effective error voltage Verr_eff.

If VOK1 is at a logic one (1) and VOK2 is at a logic zero (0) at the beginning of a regulation interval, the logic circuit 590 turns off switch S4 and turns on switch S5. Accordingly, the effective error voltage Verr_eff is based on the second error voltage Verr2 associated with the second output voltage Vout2. The effective error voltage Verr_eff is the threshold voltage for the pulse width modulator 550.

Further, at the beginning of the regulation interval, marked by the rising edge of the clock CLK, the RS-flip-flop 560 generates a high logic signal to turn on the switch S0 and cause the inductor current $I_L$ to rise with a slope of Vin/L. At such time, the logic circuit 590 has configured the demultiplexer 580 to select switch S2. Thus, the inverter 570 inverts the high logic signal from the RS-flip-flip 560 to generate a low logic signal. The demultiplexer 580 passes the low logic signal to turn off or maintain switch S2 off. The voltage $V_{LR}$ rises in accordance with the inductor current $I_L$.

When the voltage $V_{LR}$ reaches the effective error voltage Verr_eff, the pulse width modulator 550 transitions its output from a low logic signal to a high logic signal. The high logic signal resets the RS-flip-flop 560 causing it to output a low logic signal. The low logic signal turns off switch S0. The inverter 570 inverts the low logic signal to generate a high logic signal. The demultiplexer 580 passes the high logic signal to turn on switch S2. Thus, the magnetic energy stored in the inductor L due to the rising inductor current $I_L$ while switch S0 was on flows into the second load to change the second output voltage Vout2 by an amount related to the effective error voltage Verr_eff. In this case, the regulation interval is only a single clock cycle.

If VOK1 is at a logic zero (0) and VOK2 is at a logic one (1) at the beginning of a regulation interval, the logic circuit 590 turns on switch S4 and turns off switch S5. Accordingly, the effective error voltage Verr_eff is based on the first error voltage Verr1 associated with the first output voltage Vout1. The effective error voltage Verr_eff is the threshold voltage for the pulse width modulator 550.

Further, at the beginning of the regulation interval, marked by the rising edge of the clock CLK, the RS-flip-flop 560 generates a high logic signal to turn on the switch S0 and cause the inductor current $I_L$ to rise with a slope of Vin/L. At such time, the logic circuit 590 has configured the demultiplexer 580 to select switch S1. Thus, the inverter 570 inverts the high logic signal from the RS-flip-flip 560 to generate a low logic signal. The demultiplexer 580 passes the low logic signal to turn off or maintain switch S1 off. The voltage $V_{LR}$ rises in accordance with the inductor current $I_L$.

When the voltage $V_{LR}$ reaches the effective error voltage Verr_eff, the pulse width modulator 550 transitions its output from a low logic signal to a high logic signal. The high logic signal resets the RS-flip-flop 560 causing it to output a low logic signal. The low logic signal turns off switch S0. The inverter 570 inverts the low logic signal to generate a high logic signal. The demultiplexer 580 passes the high logic signal to turn on switch S1. Thus, the magnetic energy stored in the inductor L due to the rising inductor current $I_L$ while switch S0 was on flows into the first load to change the first output voltage Vout1 by an amount related to the effective error voltage Verr_eff. In this case, the regulation interval is only a single clock cycle.

If both VOK1 and VOK2 are both at a logic ones (1s) at the beginning of a regulation interval, and the first load is drawing more current than the second load, the logic circuit 590 turns on switch S4 and turns off switch S5. Accordingly, the effective error voltage Verr_eff is based on the first error voltage Verr1 associated with the first output voltage Vout1. The effective error voltage Verr_eff is the threshold voltage for the pulse width modulator 550.

Further, at the beginning of the regulation interval, marked by the rising edge of the clock CLK, the RS-flip-flop 560 generates a high logic signal to turn on the switch S0 and cause the inductor current $I_L$ to rise with a slope of Vin/L. At such time, the logic circuit 590 has configured the demultiplexer 580 to select switch S1. Thus, the inverter 570 inverts the high logic signal from the RS-flip-flip 560 to generate a low logic signal. The demultiplexer 580 passes the low logic signal to turn off or maintain switch S1 off. The voltage $V_{LR}$ rises in accordance with the inductor current $I_L$.

When the voltage $V_{LR}$ reaches the effective error voltage Verr_eff, the pulse width modulator 550 transitions its output from a low logic signal to a high logic signal. The high logic signal resets the RS-flip-flop 560 causing it to output a low logic signal. The low logic signal turns off switch S0. The inverter 570 inverts the low logic signal to generate a high logic signal. The demultiplexer 580 passes the high logic signal to turn on switch S1. Thus, the magnetic energy stored in the inductor L due to the rising inductor current $I_L$ while switch S0 was on flows into the first load to change the first output voltage Vout1 by an amount related to the effective error voltage Verr_eff. In this case, the regulation interval is only a single clock cycle.

If both VOK1 and VOK2 are both at a logic ones (1s) at the beginning of a regulation interval, and the second load is drawing more current than the first load, the logic circuit 590 turns on switch S5 and turns off switch S4. Accordingly, the effective error voltage Verr_eff is based on the second error voltage Verr2 associated with the second output voltage Vout2. The effective error voltage Verr_eff is the threshold voltage for the pulse width modulator 550.

Further, at the beginning of the regulation interval, marked by the rising edge of the clock CLK, the RS-flip-flop 560 generates a high logic signal to turn on the switch S0 and cause the inductor current $I_L$ to rise with a slope of Vin/L. At such time, the logic circuit 590 has configured the demultiplexer 580 to select switch S2. Thus, the inverter 570 inverts the high logic signal from the RS-flip-flip 560 to generate a low logic signal. The demultiplexer 580 passes the low logic signal to turn off or maintain switch S2 off. The voltage $V_{LR}$ rises in accordance with the inductor current $I_L$.

When the voltage $V_{LR}$ reaches the effective error voltage Verr_eff, the pulse width modulator 550 transitions its output from a low logic signal to a high logic signal. The high logic signal resets the RS-flip-flop 560 causing it to output a low logic signal. The low logic signal turns off switch S0. The inverter 570 inverts the low logic signal to generate a high logic signal. The demultiplexer 580 passes the high logic signal to turn on switch S2. Thus, the magnetic energy stored in the inductor L due to the rising inductor current $I_L$ while switch S0 was on flows into the second load to change the second output voltage Vout2 by an amount related to the effective error voltage Verr_eff. In this case, the regulation interval is only a single clock cycle.

Figure 6:
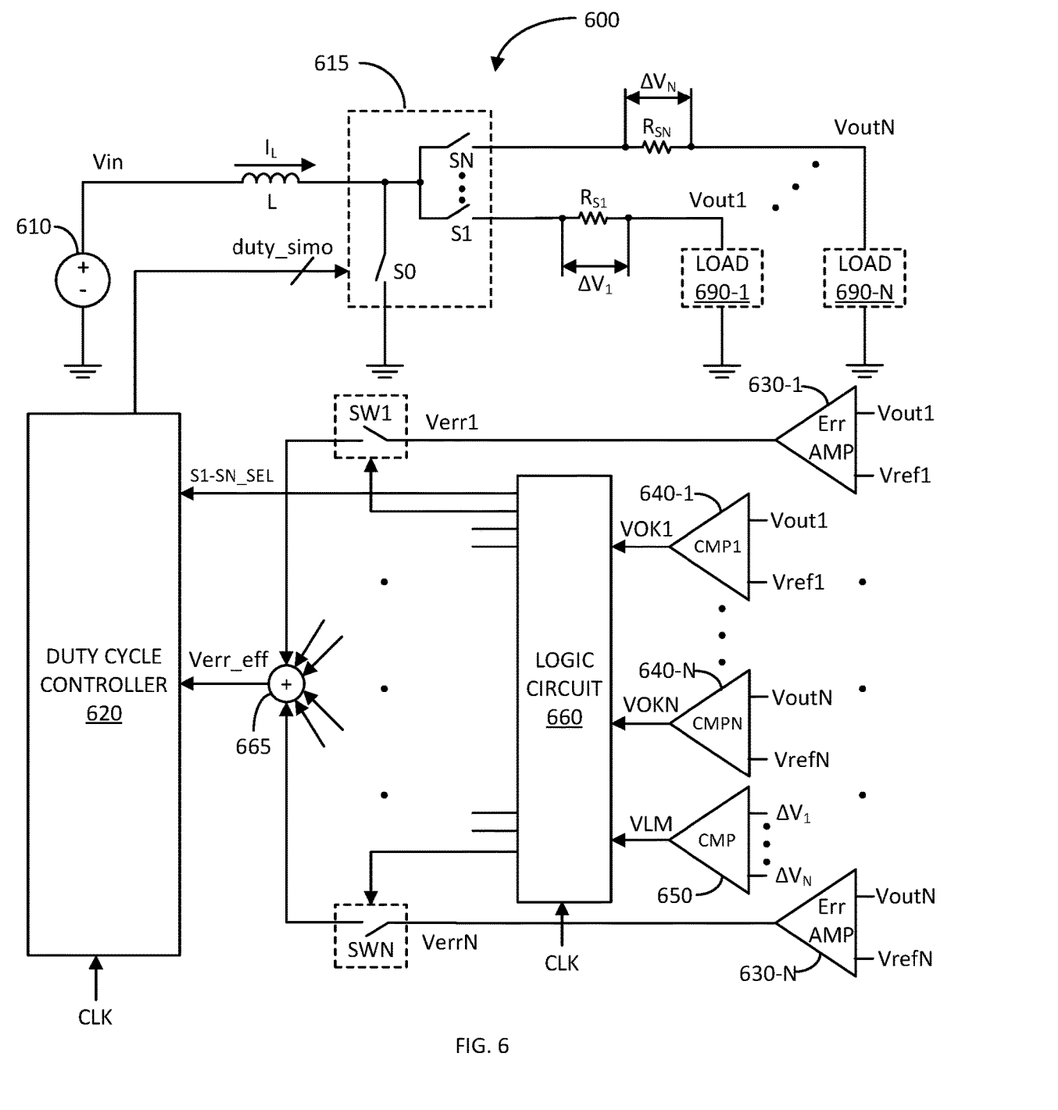
FIG. 6 illustrates a schematic diagram of another exemplary switched common-mode current control, single-inductor-multiple-output (SIMO) power converter in accordance with another aspect of the disclosure.

FIG. 6 illustrates a schematic diagram of another exemplary switched common-mode current control, single-inductor-multiple-output (SIMO) power converter 600 in accordance with another aspect of the disclosure. The regulation technique performed by power converter 400 may be extended to regulating N number of output voltages Vout1 to VoutN using a single inductor, where N is an integer of two or more.

In particular, the power converter 600 includes a voltage source 610 and a regulation circuit including an inductor L, a switching network 615 including a set of switches S0 to SN, and a set of current-sense resistors $R_{S1}$-$R_{SN}$. The regulation circuit further includes a set of error amplifiers 630-1 to 630-N, a set of comparators 640-1 to 640-N, and a load comparator 650. Additionally, the power converter 600 includes a logic circuit 660, a set of switches SW1 to SWN, a summing device 665, and a duty cycle controller 620. The regulation circuit processes an input voltage Vin generated by the voltage source 610 to generate and regulate a set of output voltages Vout1 to VoutN for a set of loads 690-1 to 690-N, respectively.

The voltage source 610, which may be configured as a battery or other type of voltage source, generates the input voltage Vin at its positive terminal, and includes a negative terminal coupled to ground. The inductor L is coupled between the positive terminal of the voltage source 610 and respective first terminals of the set of switches S1 to SN. The set of current-sensing resistors $R_{S1}$ to $R_{SN}$ are coupled between respective second terminals of the set of switches S1 to SN and a set of outputs of the power converter 600 (the nodes at which the set of output voltages Vout1 to VoutN are generated, respectively). The set of loads 690-1 to 690-N are coupled between the set of outputs of the power converter 600 and ground, respectively. The switch S0 is coupled between the respective first terminals of the set of switches S1 to SN and ground.

The set of error amplifiers 630-1 to 630-N include respective first inputs configured to receive the set of output voltages Vout1 to VoutN, and respective second inputs configured to receive a set of reference voltages Vref1 to VrefN. The set of reference voltages Vref1 to VrefN are the target voltages for the set of output voltages Vout1 to VoutN, respectively. The set of error amplifiers 630-1 to 630-N generate a set of error voltages Verr1 to VerrN related to differences between the set of output voltages Vout1 to VoutN and the set of reference voltages Vref1 to VrefN, respectively.

The set of comparators 640-1 to 640-N include respective first (e.g., positive) inputs configured to receive the set of output voltages Vout1 to VoutN, and respective second (e.g., negative) inputs configured to receive the set of reference voltages Vref1 to VrefN. The set of comparators 640-1 to 640-N generate a set of signals VOK1 to VOKN indicating whether the set of output voltages Vout1 to VoutN are greater than the set of reference voltages Vref1 to VrefN, respectively.

The load comparator 650 includes a set of inputs configured to receive a set of voltages $\Delta V_1$ to $\Delta V_N$ across the set of current-sense resistor $R_{S1}$ to $R_{SN}$, respectively. The load comparator 650 generates a signal VLM indicating which of the set of voltage $\Delta V_1$ to $\Delta V_N$ is greatest to indicate which of the set of loads 690-1 to 690-N is drawing the most current.

The logic circuit 660 synchronously controls the ON/OFF states of the set of switches SW1 to SWN and the set of switches S1 to SN via the S1-SN_SEL signal based on the set of signals VOK1 to VOKN, the signal VLM, and a clock CLK, as discussed in more detail below. The summing device 665 generates an effective error voltage Verr_eff based on at least one or more of the set of error voltages Verr1 to VerrN.

The duty cycle controller 620, which receives the substantially periodic clock CLK and the S1-SN_SEL signal, generates a control signal duty_simo for controlling the duty cycle $\Delta T_{S0}/T_{CLK}$ associated with the switch S0 versus the selected switches S1 to SN for the selected number of regulation clock cycles based on the effective error voltage Verr_eff.

Figure 7:
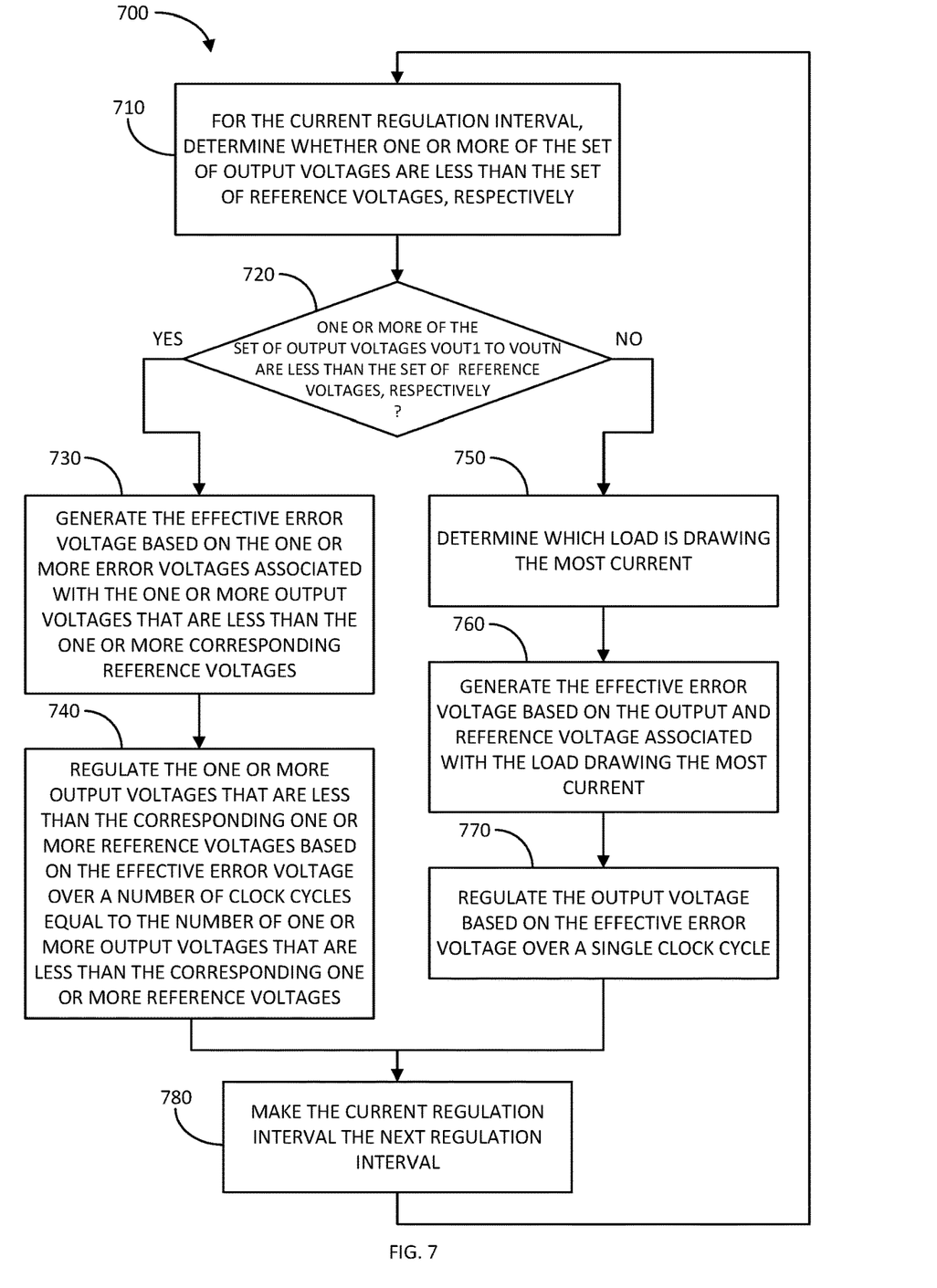
FIG. 7 illustrates a flow diagram of an exemplary method of operating the power converter of FIG. 6 in accordance with another aspect of the disclosure.

FIG. 7 illustrates a flow diagram of an exemplary method 700 of operating the power converter 600 in accordance with another aspect of the disclosure.

According to the method 700, for the current regulation interval, the logic circuit 660 determines whether one or more of the set of output voltages Vout1 to VoutN are less than the set of reference voltages Vref1 to VrefN, respectively (block 710). The logic circuit 660 may make this determination based on the states of the set of signals VOK1 to VOKN, respectively.

Further, according to the method 700, if the logic circuit 660, in block 720, determines that one or more of the set of output voltages Vout to VoutN are less than the corresponding one or more of the set of reference voltages Vref1 to VrefN, respectively, the logic circuit 660 causes the generation of the effective error voltage Verr_eff to be based on the one or more error voltages associated with the one or more output voltages that are less than the one or more corresponding reference voltages (block 730). The logic circuit 660 may perform this by turning on one or more of the set of switches SW1 to SWN associated with the one or more output voltages that are less than the one or more corresponding reference voltages; thereby allowing the summing device 665 to generate the effective error voltage Verr_eff.

Then, according to the method 700, the one or more output voltages that are less than the corresponding one or more reference voltages are regulated based on the effective error voltage Verr_eff over a number of clock cycles (in a time-multiplexed manner) equal to the number of one or more output voltages that are less than the corresponding one or more reference voltages (block 740). The duty cycle controller 620, based on the clock CLK and the S1-SN_SEL signal from the logic circuit 660, controls the ON/OFF states of switch S0 and one or more of the set of switches S1 to SN corresponding to the one or more output voltages that need to be regulated during the current regulation interval.

If, in block 720 of the method 700, the logic circuit 660 determines that none of the output voltages Vout1 to VoutN are less than the corresponding reference voltages Vref1 to VrefN based on the states of the VOK1 to VOKN signals, then the logic circuit 660 determines which load of the set of loads 690-1 to 690-N is drawing the most current (block 750). The logic circuit 660 may make this determination based on the state of the VLM signal.

Then, according to the method 700, the logic circuit 660 causes the generation of the effective error voltage Verr_eff to be based substantially on error voltage associated with the load drawing the most current (block 760). The logic circuit 660 may perform this by turning on only the switch among the set of switches SW1 to SWN associated with load drawing the most current; thereby allowing the summing device 665 to generate the effective error voltage Verr_eff.

Then, according to the method 700, the output voltage associated with the load drawing the most current is regulated based on the effective error voltage over a single clock cycle (block 770). The duty cycle controller 620, based on the clock CLK and the S1-SN_SEL signal from the logic circuit 660, controls the ON/OFF states of switch S0 and the switch (one of switches S1 to SN) corresponding to the load drawing the most current to regulate the corresponding output voltage for the current regulation interval.

After completion of the operation specified in block 740 or 770, according to the method 700, the regulation of one or more of the output voltages proceeds to the next regulation interval where the operations starting with block 710 are performed as discussed above (block 780).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

The invention claimed is:

1. An apparatus, comprising:
a voltage source configured to generate an input voltage; and
a regulation circuit configured to generate a set of output voltages based on the input voltage, wherein the regulation circuit is configured to change only a subset of or the entire set of output voltages using the input voltage in a current regulation interval based on different scenarios regarding whether the set of output voltages are greater or less than a set of corresponding reference voltages, respectively;
wherein the regulation circuit is configured to change only one of the output voltage over the current regulation interval if the output voltages of the entire set are greater than the corresponding reference voltages, wherein the one of the output voltage is associated with a load drawing the most current among one or more loads associated with the remaining one or more output voltages of the set.

2. The apparatus of claim 1, wherein the regulation circuit is configured to change only one of the output voltage over the current regulation interval if the one of the output voltage is less than the corresponding reference voltages, and the remaining one or more output voltages of the set are greater than the one or more corresponding reference voltages.

3. The apparatus of claim 2, wherein the regulation circuit is configured to change the only one of the output voltage based on an error voltage related to a difference between the only one of the output voltage and the corresponding reference voltage.

4. The apparatus of claim 2, wherein a duration of the current regulation interval is one or more periods of a clock.

5. An apparatus, comprising:
a voltage source configured to generate an input voltage; and
a regulation circuit configured to generate a set of output voltages based on the input voltage, wherein the regulation circuit is configured to change only a subset of or the entire set of output voltages using the input voltage in a current regulation interval based on different scenarios regarding whether the set of output voltages are greater or less than a set of corresponding reference voltages, respectively;
wherein the regulation circuit is configured to change only the subset of the set of output voltages over the current regulation interval if the output voltages of the subset are less than the corresponding reference voltages, and the remaining one or more output voltages of the set is greater than the one or more corresponding reference voltages;
wherein the regulation circuit is configured to change only the subset of the output voltages over the current regulation interval in a time multiplexed manner.

6. The apparatus of claim 1, wherein the regulation circuit is configured to change the entire set of output voltages over the current regulation interval if the entire set of output voltages are less than the corresponding reference voltages.

7. The apparatus of claim 6, wherein the regulation circuit is configured to change the entire set of output voltages based on an error voltage related to differences between the entire set of output voltages and the corresponding reference voltages, respectively.

8. The apparatus of claim 7, wherein the error voltage is related to an average of the differences between the entire set of output voltages and the corresponding reference voltages, respectively.

9. The apparatus of claim 6, wherein the regulation circuit is configured to change the entire set of the output voltages over the current regulation interval in a time multiplexed manner.

10. The apparatus of claim 9, wherein each subinterval for changing each of the output voltage in the entire set has a duration of one or more periods of a clock.

11. The apparatus of claim 1, wherein the regulation circuit is configured to change the only one of the output voltage based on an error voltage related to a difference between the only one of the output voltage and the corresponding reference voltage.

12. The apparatus of claim 5, wherein each subinterval for regulating each of the output voltage in the subset has a duration of one or more periods of a clock.

13. The apparatus of claim 12, wherein the regulation circuit is configured to change only the subset of the output voltages based on an error voltage related to differences between the subset of output voltages and the corresponding reference voltages, respectively.

14. The apparatus of claim 13, wherein the error voltage is related to an average of the differences between the subset of output voltages and the corresponding reference voltages, respectively.

15. A method, comprising:
generating an input voltage;
generating a set of output voltages based on the input voltage; and
changing only a subset of or the entire set of output voltages using the input voltage in a current regulation interval based on different scenarios regarding whether the set of output voltages are greater or less than a set of corresponding reference voltages, respectively;
wherein changing only the subset of the set of output voltages comprises changing only one of the output voltages over the current regulation interval if the output voltages of the entire set are greater than the corresponding reference voltages, wherein the only one of the output voltage is associated with a load drawing the most current among one or more loads associated with the remaining one or more output voltages of the set.

16. The method of claim 15, wherein changing only the subset of the set of output voltages comprises changing only the subset of the set of output voltages over the current regulation interval if the one or more output voltages of the subset are less than the corresponding one or more reference voltages, and the remaining one or more output voltages of the set is greater than the one or more corresponding reference voltages.

17. The method of claim 16, wherein changing only the subset of one or more output voltages comprises changing the subset of one or more output voltages based on an error voltage related to one or more differences between the one or more output voltages of the subset and the one or more corresponding reference voltages, respectively.

18. The method of claim 15, wherein changing the entire set of output voltages comprises changing the entire set of output voltages over the current regulation interval if the entire set of output voltages are less than the corresponding reference voltages.

19. The method of claim 18, wherein changing the entire set of output voltages is based on an error voltage related to differences between the entire set of output voltages and the corresponding reference voltages, respectively.

20. The method of claim 15, wherein changing the only one of the output voltage comprises changing the only one of the output voltage based on an error voltage related to a difference between the only one of the output voltage and the corresponding reference voltage.

21. An apparatus, comprising:
means for generating an input voltage;
means for generating a set of output voltages based on the input voltage; and
means for changing only a subset of or the entire set of output voltages using the input voltage in a current regulation interval based on different scenarios regarding whether the set of output voltages are greater or less than a set of corresponding reference voltages, respectively;
wherein the means for changing only the subset of the set of output voltage comprises means for changing only one of the output voltages over the current regulation interval if the output voltages of the entire set are greater than the corresponding reference voltages, wherein the only one of the output voltage is associated with a load drawing the most current among one or more loads associated with the remaining one or more output voltages of the set.

22. The apparatus of claim 21, wherein the means for changing only the subset of the set of output voltages comprises means for changing only the subset of the set of output voltages over the current regulation interval if the one or more output voltages of the subset are less than the corresponding one or more reference voltages, and the remaining one or more output voltages of the set is greater than the one or more corresponding reference voltages.

23. The apparatus of claim 22, wherein the means for changing only the subset of one or more output voltages comprises means for regulating the subset of one or more output voltages based on an error voltage related to one or more differences between the one or more output voltages of the subset and the one or more corresponding reference voltages, respectively.

24. The apparatus of claim 21, wherein the means for changing the set of output voltages comprises means for changing the entire set of output voltages over the current regulation interval if the entire set of output voltages are less than the corresponding reference voltages.

25. The apparatus of claim 24, wherein the means for changing the entire set of output voltages comprises means for changing the entire set of output voltages based on an error voltage related to differences between the entire set of output voltages and the corresponding reference voltages, respectively.

26. The apparatus of claim 21, wherein the means for changing the only one of the output voltage comprises means for changing the only one of the output voltage based on an error voltage related to a difference between the only one of the output voltage and the corresponding reference voltage.

* * * * *